United States Patent [19]

Sato

[11] Patent Number: 5,748,833
[45] Date of Patent: May 5, 1998

[54] STILL VIDEO APPARATUS HAVING DATA SIGNAL SUPPRESSION

[75] Inventor: Koichi Sato, Tokyo, Japan

[73] Assignee: Asahi Kogaku Kogyo Kabushiki Kaisha, Tokyo, Japan

[21] Appl. No.: 395,537

[22] Filed: Feb. 28, 1995

Related U.S. Application Data

[63] Continuation of Ser. No. 200,544, Feb. 22, 1994, abandoned, which is a continuation of Ser. No. 815,862, Jan. 2, 1992, abandoned, which is a continuation-in-part of Ser. No. 486,886, Mar. 1, 1990, abandoned.

[30] Foreign Application Priority Data

Mar. 7, 1989 [JP] Japan ......................... 1-54176
Mar. 7, 1989 [JP] Japan ......................... 1-54177

[51] Int. Cl.⁶ ..................... H04N 5/92; H04N 5/928; H04N 5/781
[52] U.S. Cl. ..................... 386/95; 386/96; 386/102; 386/106; 386/115; 386/125
[58] Field of Search ..................... 358/310, 335, 358/342, 341, 343, 906, 22, 909.1, 327; 360/18, 27, 35.1, 33.1, 61, 19.1; 348/584; 328/165; 386/1, 39, 45, 95–106, 125–126; H04N 5/76, 5/78, 5/781, 5/782, 5/783, 5/92, 9/79, 5/928

[56] References Cited

U.S. PATENT DOCUMENTS

| | | | |
|---|---|---|---|
| 4,477,843 | 10/1984 | Kinjo et al. | 358/342 |
| 4,800,448 | 1/1989 | Kaneko et al. | 360/27 |
| 4,812,987 | 3/1989 | Yamawaki et al. | 328/165 |
| 4,827,357 | 5/1989 | Kawakami | 358/310 |
| 4,954,880 | 9/1990 | Tanimizu | 358/181 |
| 5,097,348 | 3/1992 | Suetaka | 358/355 |
| 5,166,804 | 11/1992 | Takahashi | 358/342 |
| 5,200,862 | 4/1993 | Sato . | |
| 5,245,484 | 9/1993 | Sato . | |
| 5,475,499 | 12/1995 | Taguchi | 358/341 |

FOREIGN PATENT DOCUMENTS

| | | |
|---|---|---|
| 0280573 | 3/1988 | European Pat. Off. . |
| 379444 | 7/1990 | European Pat. Off. . |
| 3708276 | 3/1987 | Germany . |
| 62-102402 | 10/1987 | Japan . |
| 62-290282 | 12/1987 | Japan . |
| 63-18878 | 1/1988 | Japan . |
| 62-276987 | 5/1988 | Japan . |
| 2216361 | 10/1989 | United Kingdom . |
| 2189963 | 11/1989 | United Kingdom . |

OTHER PUBLICATIONS

Patent Abstract of Japanese Publication 62–276987.
Patent Abstract of Japanese Publication 62–102402.

Primary Examiner—Thai Tran
Attorney, Agent, or Firm—Greenblum & Bernstein, P.L.C.

[57] ABSTRACT

A still video apparatus including a picture signal reproducing device and a data signal reproducing device for reproducing picture signals and DPSK modulation data signals, recorded on a magnetic disk, and a control unit which, upon play-back, commences the reproduction of the picture signals after a predetermined number of data signals is reproduced with or without an external operating device.

50 Claims, 4 Drawing Sheets

STILL VIDEO APPARATUS HAVING DATA SIGNAL SUPPRESSION

This application is a continuation of application Ser. No. 08/200,544, filed Feb. 22, 1994, now abandoned, which is a continuation of application Ser. No. 07/815,862, filed Jan. 2, 1992, now abandoned, which is a continuation of application Ser. No. 07/486,886, filed Mar. 1, 1990, now abandoned.

BACKGROUND OF THE INVENTION

1. Field of the Invention

The present invention relates to a still video apparatus, such as a still video camera.

2. Description of Related Art

In a conventional still video camera, an object image is converted to electrical signals by an imaging device to form a luminance signal (Y) and color signal (C) which are FM-modulated, so that a resultant signal forms a picture signal to be recorded on the magnetic disk. According to the recently established standards of still video cameras, signals of data, such as the kind of recording (field recording or frame recording), the track number, etc. are superimposed on the picture signal to be recorded on the magnetic disk in a multiple frequency system.

Known data signal modulation systems use DPSK (Differential Phase Shift Keying) modulation in which data is DPSK-modulated, so that the data signals are superimposed on the picture signals to be recorded together on the magnetic disk. Upon play-back (reproduction), the data signals are extracted from the FM-modulated signals which are read from the magnetic disk, so that the waveshape thereof is rectified to be DPSK-modulated.

However, when the waveshape of the DPSK signals are rectified, the amplitude thereof increases, so that an intense noise occurs particularly at the ascending and descending portions of the amplitude, resulting in an adverse influence on the picture signals. Furthermore, since the DPSK signals are synchronous with horizontal synchronous signals, the picture signals of the same track are repeatedly reproduced, and accordingly, upon monitoring by a TV monitor, the noise appears as an offensive fixed noise (vertical lines) on a picture plane.

Furthermore, once the data signal are reproduced, it is not necessary to reproduce the same data twice, and accordingly, it is possible to eliminate the noise by not rectifying the waveshape of the second data signal and the subsequent data signals. However, even in this case, offensive noise instantaneously appears on the picture plane at the beginning of reproduction.

SUMMARY OF THE INVENTION

The primary object of the present invention is to provide a still video apparatus where upon play-back, no noise due to the rectified data signals occurs.

To achieve the object mentioned above, according to the present invention, there is provided a still video apparatus comprising means for reading multiple recorded signals from a magnetic disk on which picture signals and data signals, which are modulated in a DPSK-modulation to be superimposed on the picture signals are recorded to form the multiple recorded signals, data signal reproducing means for extracting and reproducing the data signals from the multiple recorded signals read by the reading means, and means for controlling the reproduction of the data signal reproducing means by an external operation.

With this arrangement, since the rectification of the waveshape of the data signals which are read out from the recording medium (recording disk) by the reading means can be optionally controlled by an operator, when the rectification operation is turned OFF by the controlling means, a noise which would otherwise occur due to the rectification can be eliminated, thus resulting in reproduction of a noiseless, clear picture.

According to another aspect of the present invention, there is provided a still video apparatus comprising a magnetic head which reads multiple recorded signals from a magnetic disk on which picture signals and data signals are recorded to form the multiple recorded signals, tracking means for moving the magnetic head to a predetermined track, picture signal reproducing means and data signal reproducing means for separating the picture signals and the data signals from the multiple recorded signals read by the magnetic head to reproduce the picture signals and the data signals, and means for controlling the reproduction of the data signal reproducing means and data signal reproducing means.

With this arrangement, since no reproduction of the picture signals is carried out until the reproduction of the data signals is finished, so that the reproduction of the picture signals is commenced after the reproduction of the data signals is finished, the picture signals are free from noise which occurs upon reproduction of the data signals.

Furthermore, if the same multiple recorded signal is reproduced more than once, only a first rectification of the waveshape thereof is carried out, and no subsequent rectifications are effected. As a result, as soon as a desired data is obtained, a noiseless, clear picture can be reproduced.

BRIEF DESCRIPTION OF THE DRAWINGS

The invention will be described below in detail with reference to the accompanying drawings, in which.

DESCRIPTION OF PREFERRED EMBODIMENTS

Figure 1:
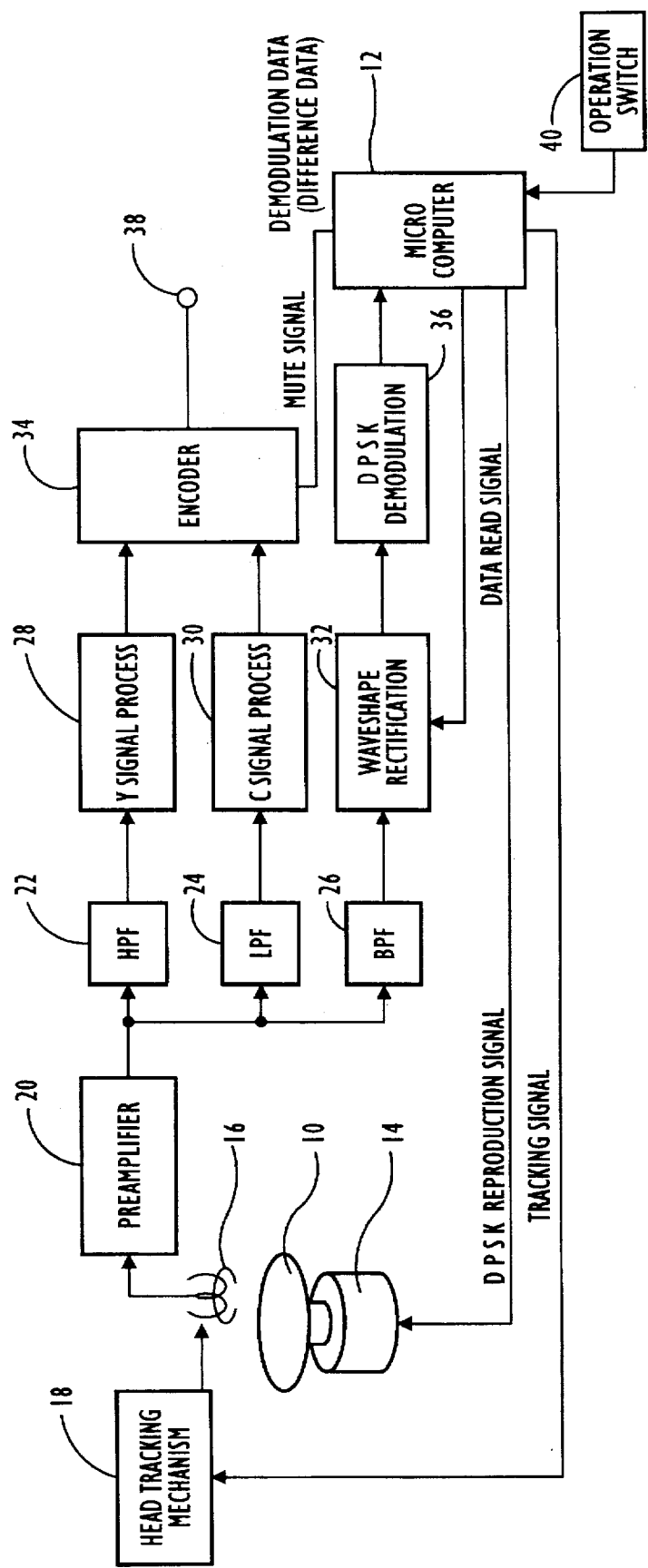
FIG. 1 is a block diagram of a control circuit of a still video apparatus according to the present invention.

In FIG. 1, which shows a still video play-back device according to an embodiment of the present invention, picture signals consisting of a color signal, a luminance signal, and data signals are superimposed and recorded on a magnetic disk (video floppy) 10. The luminance signal and the color signal are FM-modulated with high frequency band and low frequency band, respectively. The data signals are modulated in a DPSK modulation with a lower frequency band.

The magnetic disk 10 is driven to rotate by a servo-motor 14 which is controlled by a microcomputer 12, so that the multiple recorded signals recorded on the magnetic disk 10 are read by a magnetic head 16. The magnetic head 16 is moved by a head tracking mechanism 18 to a desired track, as is well known. The head tracking mechanism 18 is controlled by the microcomputer 12 to track the magnetic head 16 at a predetermined pitch. The microcomputer 12 generally controls the whole operation of the still video apparatus.

The multiple recorded signals read by the magnetic head 16 are amplified by a preamplifier 20 and outputted to a high-pass filter (HPF) 22, a low-pass filter (LPF) 24, and a band pass filter (BPF) 26. The high-pass filter 22 permits only the luminance signals of high frequency band to pass through, and the low-pass filter 24 permits only the color signals of low frequency band to pass through. The band pass filter which serves as data signal extracting means passes only the DPSK signals of the data signals through.

The luminance signals past the high-pass filter 22 and the color signals past the low-pass filter 24 are processed in a luminance signal processing circuit 28 and a color signal processing circuit 30 to be fed to an encoder 34, respectively. The encoder 34 demodulates the FM-modulated luminance and color signals, compounding them to thereby form compound video signals which are outputted to a video terminal 38. The high-pass filter 22, the low-pass filter 24, the luminance signal processing circuit 28, the color signal processing circuit 30 and the encoder 34 constitute a picture signal reproducing means.

On the other hand, the DPSK reproduction signal past the band pass filter 26 is inputted to a waveshape rectifying circuit (wave-shaping circuit) 32 in which the waveshape is rectified to be inputted to a DPSK demodulation circuit 36. The DPSK demodulation circuit 36 demodulates the rectified DPSK reproduction signals to data signals (difference data) to be outputted to the microcomputer 12. The band pass filter 26, the wave shaping circuit 32 and the DPSK demodulation circuit 36 constitute a data signal reproduction means.

The microcomputer 12 deciphers the data signals, controls the indication based on the deciphered data, and memorizes the data, in accordance with need.

The microcomputer 12 outputs data read signals and mute signals to the wave shaping circuit 32 and the encoder 34, respectively. The data read signals are control signals which control the ON/OFF rectification operation of the wave shaping circuit 32. The mute signals are control signals which stop the encoding operation of the encoder 34 to output picture mute signals.

An operation switch 40 is connected to an input port of the microcomputer 12. The operation switch 40 optionally performs the ON/OFF operation of the wave shaping circuit 32 and switches the manual operation of the wave shaping circuit 32 to automatic control by the microcomputer 12. A switch (not shown) is also connected to the microcomputer 12 to command the operations, such as commencement of the reproduction, stop of the reproduction, and selection of the track to be reproduced, etc.

As can be seen from the foregoing, the microcomputer 12 also generally controls the whole operation of the still video apparatus, in addition to the ON/OFF control of the reproduction of the data signals and the picture signals.

Figure 3:
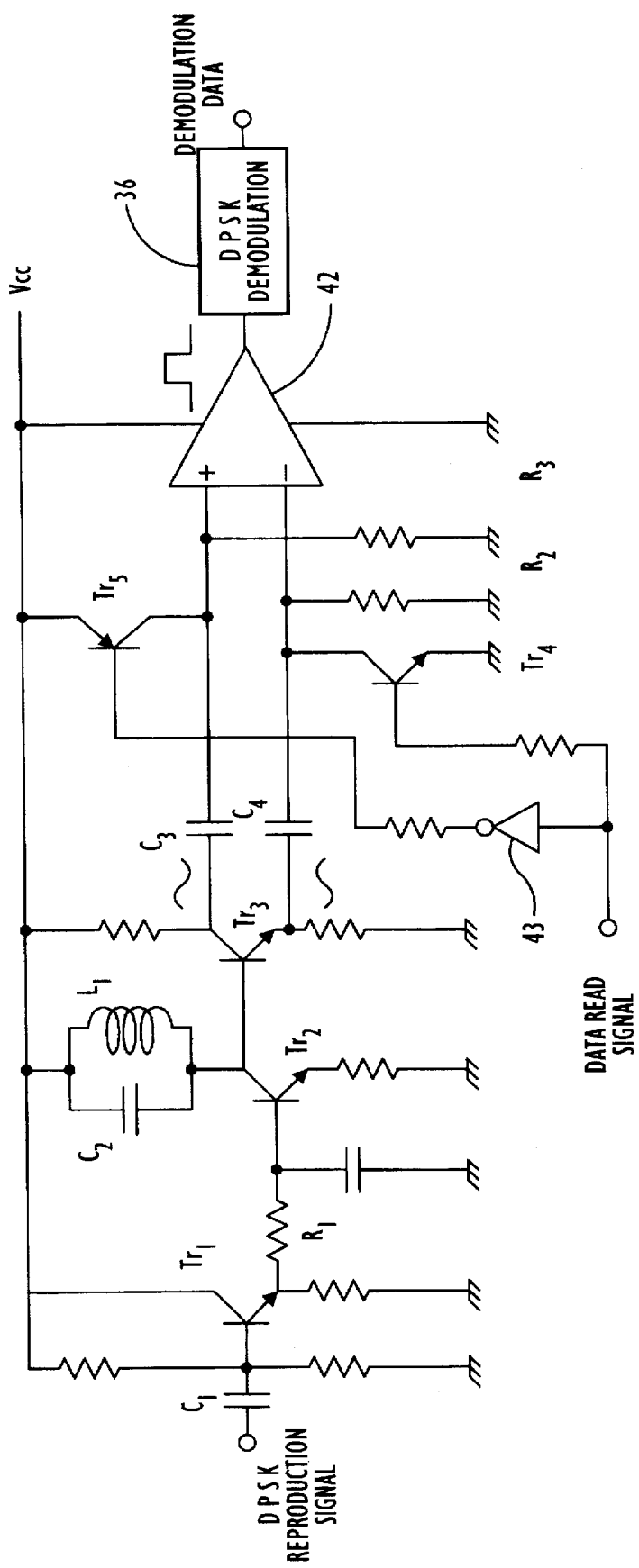
FIG. 3 is a diagram of a waveshape rectifying (waveshaping) circuit in a still video apparatus according to the present invention, by way of an example; and, FIG. 4 is a diagram of another waveshape rectifying circuit in a still video apparatus according to the present invention.
Figure 4:
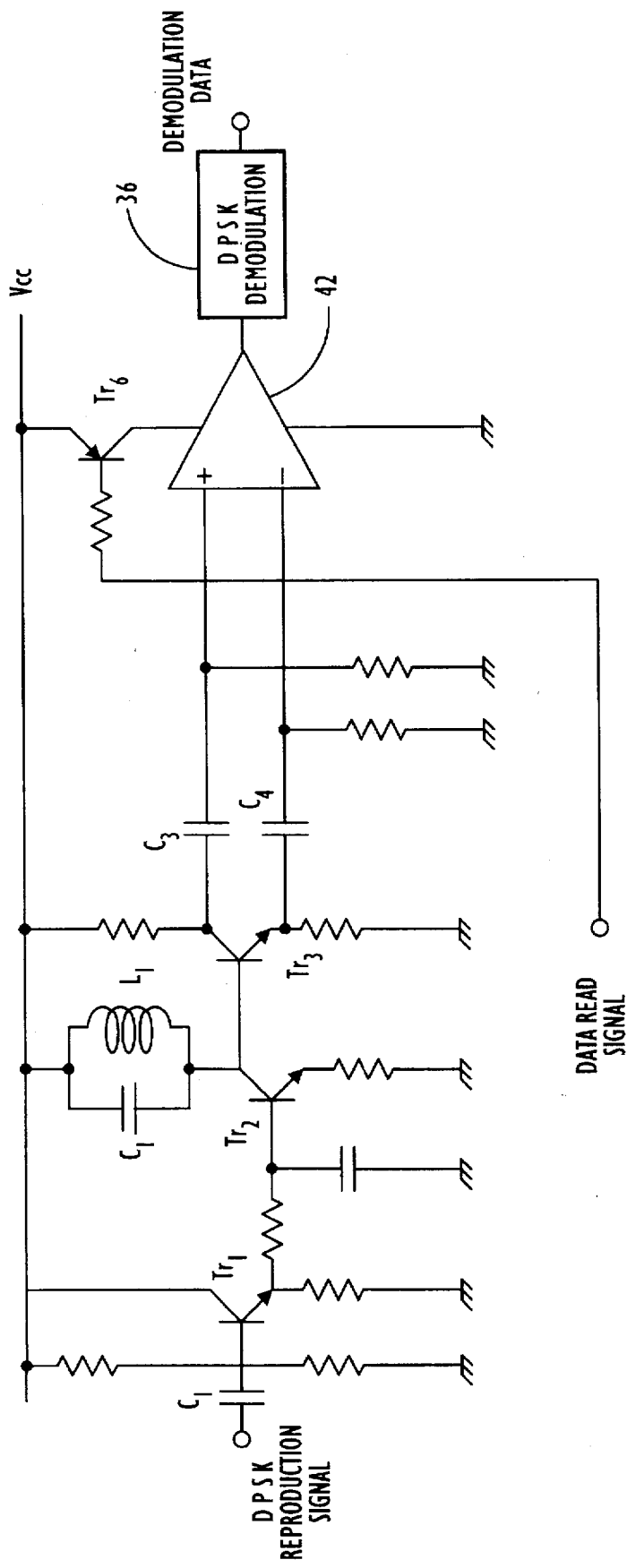

FIGS. 3 and 4 show different embodiments of the waveshape rectifying circuit 32.

The DPSK reproduction signal past the band pass filter 26 is outputted to a base of a transistor Tr1 through a condenser C1. An emitter of the transistor Tr1 is connected to a base of a second transistor Tr2 through a resistor R1. A collector of the transistor Tr2 is connected to a power source (battery) Vcc through a condenser C2 and a coil L1 in parallel to form a band amplifier.

The connection of the transistor Tr2 to the condenser C2 and the coil L1 is connected to a base of a third transistor Tr3. A collector and an emitter of the transistor Tr3 are connected to a non-inverted terminal and an inverted terminal of a comparator 42 through condensers C3 and C4, respectively. Pull down resistors R2 and R3 are provided between the condenser C3 and the non-inverted terminal and between the condenser C4 and the inverted terminal, respectively. The output terminal of the comparator 42 is connected to the DPSK demodulation circuit 36.

The data read signals are fed to a base of a fourth transistor Tr4 and to a base of a fifth transistor Tr5 through an inverter 43. A collector of the transistor Tr4 is connected to the line between the condenser C4 and the inverted terminal of the comparator 42. A collector of the transistor Tr5 is connected to the line between the condenser C3 and the non-inverted terminal of the comparator 42.

With the circuit constructed above, the DPSK signals inputted to the waveshape rectifying circuit 32 are amplified, and a direct current component, a high frequency component and a noise thereof are eliminated before inputted to the base of the transistor Tr3. Different waveshapes having opposite phases appear at the collector and the emitter of the transistor Tr3. When the data read signal is ON (i.e. level "L"), the non-inverted terminal and the inverted terminal of the comparator 42 have voltages of opposite phases. As a result, the output of the comparator 42 is identical to the DPSK modulation signal, with a rectified waveshape.

When the data read signal is OFF (i.e. level "H"), the transistors Tr4 and Tr5 are turned ON, so that the collector current is supplied to these transistors. As a result, the inverted terminal and the non-inverted terminal of the comparator 42 become ground level ("L") and Vcc level ("H"), respectively, so that the output of the comparator 42 is always "H".

As can be understood from the above discussion, in the circuit shown in FIG. 3, when the data read signal is ON ("L"), the rectifying operation of the waveshape is performed, and when the data read signal is OFF ("H"), no rectifying operation of the waveshape is performed.

FIG. 4 shows another embodiment of a waveshape rectifying circuit according to the present invention The circuit arrangement shown in FIG. 4 is similar to that of FIG. 3 except for the connection circuit of the data read signals. Namely, in the modified embodiment shown in FIG. 4, a switching transistor Tr6 is provided between the battery terminal of the comparator 42 and the power source Vcc. Accordingly, when the data read signal is ON ("L"), the connection between the comparator 42 and the power source is established and when the data read signal is OFF ("H"), the connection between the comparator 42 and the power source is broken. Consequently, the comparator 42 performs and stops the rectifying operation of the waveshape when the data read signal is ON and OFF, respectively.

The play-back operation of the still video play-back apparatus according to the present invention will be described below in more detail. The play-back operation is performed in accordance with the control program prestored in the microcomputer 12.

When the operation switch 40 is actuated to start the play-back operation, the microcomputer 12 starts the servo-motor 14 to rotate the magnetic disk 10 at a predetermined number of revolutions, so that the head tracking mechanism 18 is driven to move the magnetic head 16 to a desired track. When the magnetic head 16 is moved to a desired track, the magnetic head reads the multiple recorded signals recorded on the magnetic disk 10.

During the play-back operation, the magnetic disk 10 rotates at a constant speed, and the magnetic head 16 is maintained above a desired track to repeatedly read the signals from the associated track. In case of field recording, one track forms one picture plane, and in case of frame recording, two tracks form one picture plane. Accordingly, in the illustrated embodiment, the magnetic disk 10 rotates at 60 RPS (Revolution Per Second), and the picture signals for one field are read for about 1/60 second.

The multiple recorded signals read by the magnetic head 16 are amplified by the preamplifier 20 and are fed to the high-pass filter 22, the low-pass filter 24 and the band pass filter 26. The high-pass filter 22, the low-pass filter 24 and the band pass filter 26 extract only the luminance signals, the color signals, and the DPSK modulation signals in accordance with the frequencies of the respective carrier waves to be supplied to the luminance signal processing circuit 28, the color signal processing circuit 30 and the waveshape rectifying circuit 32, respectively.

The luminance signals and the color signals for the picture signals are processed to become compound video signals through the luminance signal processing circuit 28, the color signal processing circuit 30 and the encoder 34 and are outputted to the video terminal 38. When a TV monitor is connected to the video terminal 38, the picture image can be reproduced as a still picture.

On the other hand, when an operator actuates the operation switch 40 to turn the data read signal ON, the DPSK modulation signals are rectified in the waveshape rectifying circuit 32 and are demodulated in the DPSK demodulation circuit 36 and outputted to the microcomputer 12. The microcomputer 12 deciphers and memorizes the demodulation data to perform predetermined operations, such as an indication of the track number in a display or reading of the data of the second track by the magnetic head 16 in case of field recording, etc.

When an operator actuates the operation switch 40 to turn the data read signal OFF, the operation of the waveshape rectifying circuit 32 is stopped, and accordingly, the DPSK modulation signals on the data are neither rectified nor outputted to the microcomputer 12.

Figure 2:
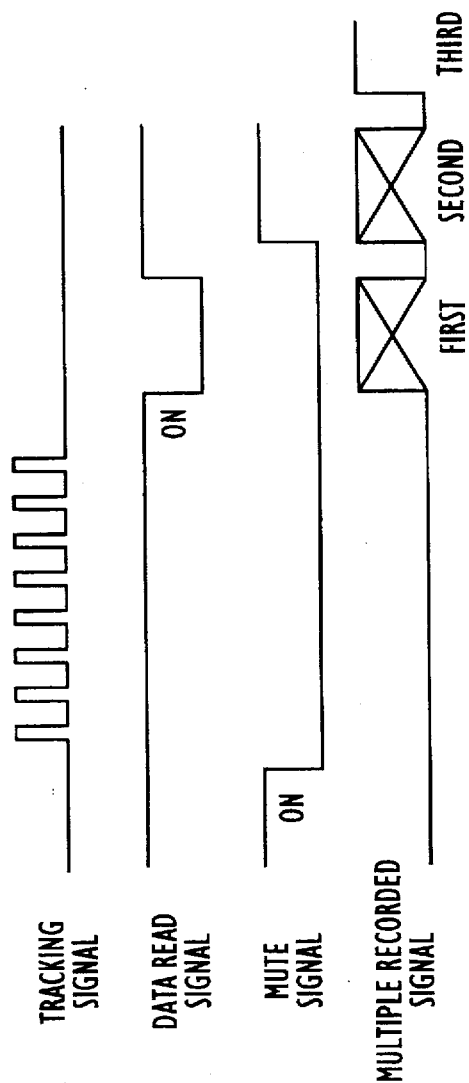
FIG. 2 is a timing chart of various signals in a still video apparatus shown in FIG. 1.

The still video apparatus according to the present invention operates as follows (particularly see FIG. 2).

The operations are characterized by the ON/OFF control of data read signals which is performed by the microcomputer 12.

When the play-back operation starts, the microcomputer 12 generates the mute signals. While the mute signals are ON, the encoder 34 outputs the picture mute signals, in spite of the input of the picture signals. As a result, the mute picture appears in the TV monitor.

Upon the completion of the tracking operation of the magnetic head 16, the multiple recorded signals are read, so that the microcomputer 12 turns the data read signal ON. Consequently, among the multiple recorded signals which are read by the magnetic head 16, the data signals past the band pass filter 26 are rectified by the rectifying circuit 32, demodulated by the DPSK demodulation circuit 36 and processed by the microcomputer 12. During the operations mentioned above, the mute signals are maintained ON.

When the first reading is finished, the microcomputer 12 turns the data read signal and the mute signal OFF. As a result, among the multiple recorded signals after the second reading of the same track read by the magnetic head 16, the picture signals are demodulated by the encoder 34 to be outputted as a compound video signal, and no data signal is rectified since the operation of the waveshape rectifying circuit 32 is stopped. Namely, once the microcomputer 12 deciphers the data signal, the data read signal is turned OFF, and the rectifying operation of the rectifying circuit 32 is stopped. Also, the mute signal is turned OFF, and the reproduction of the picture signals is commenced.

With the above-mentioned operations, after the commencement of the play-back operation, the data signals are deciphered and the picture mute signals are outputted to the TV monitor until the picture signals are reproduced, so that the mute picture appears immediately after the play-back operation is commenced, and accordingly, an offensive picture, such as white noise, does not appear.

Thereafter, the rectification is stopped and the reproduction of the picture signals is commenced. Thus, a noiseless, clear picture can be monitored.

In case of frame recording, since one picture plane is recorded on two tracks of the magnetic disk, the data read signals continue to be ON until the data signals of the second track are deciphered, and the mute signals are turned OFF after the data signals of the second track are deciphered.

As can be seen from the above discussion, according to the present invention, when an automatic data reproduction mode is selected by the operation switch 40, upon reproduction of the picture, the data signal is rectified and read out only at the first reproduction of each field. Namely, once the data signals are read out, no further rectification of the waveshape is effected, resulting in no occurrence of noise and no mergence of noise into the picture signals.

In the case of printing a reproduced picture, the printing is effected after the data read signals are turned OFF by the operation switch 40 to obtain a noiseless clear print. If the mode is an automatic data reproduction mode, the print is effected based on the second reproduction picture signal or reproduction signals subsequent thereto to obtain a noiseless clear print.

As can be seen from the above discussion, according to the present invention, since the wave-shaping of the data signals read out from the recording medium can be optionally turned ON and OFF, when the play-back of the still picture recorded on the recording medium, no noise due to wave-shaping occurs by turning the wave-shaping OFF, thus resulting in a noiseless clear reproduced picture. Furthermore, no measures for such noise are needed, resulting in a simpler design of circuits.

According to the automatic data reproduction mode in the beginning stage of play-back, only the data signals are reproduced without reproducing the picture signals, so that when the reproduction of the data signals is complete, reproduction of the picture signals is commenced, and accordingly a noiseless clear picture can be obtained even at the beginning of the reproduction of the picture signals. In this case, similarly, since no measures for noise are necessary, design of circuits can be made simpler.

It should be noted that the present invention is not limited to illustrated and above-mentioned embodiments. For instance, since the stopping the reproduction of the data signals can be carried out at any position before (upstream) the wave-shaping circuit 32, it is possible to break the input to the wave-shaping circuit 32 by an electronic switch circuit in order to stop the reproduction of the data signals.

In the data signal automatic reproduction mode, there is a possibility that data will fail to be deciphered by one (first) deciphering operation. In view of the possibility of such an error, it is possible to reproduce the read data twice or several times by subsequent deciphering operation(s). Alternatively, it is also possible to stop the reproduction of the data signals under the condition of the completion of the deciphering of the data signals.

It is also possible not to issue picture mute signals upon the commencement of the play-back operation, wherein no picture signal is reproduced.

Although the above description has been directed to a still video apparatus only for play-back, the present invention can be applied to a still video camera having a play-back function.

What is claimed is:

1. A still video apparatus comprising:
   means for reading multiple recorded signals from a magnetic disk on which picture signals and data signals are recorded together such that said data signals are superimposed on said picture signals to form said multiple recorded signals;
   means for extracting and reproducing said picture signals from the multiple recorded signals read by said reading means; and
   means for extracting said data signals from said multiple recorded signals read by said reading means;
   means for processing said data signals which have been extracted by said extracting means;
   means for reproducing said data signals which have been extracted and processed; and
   means for optionally controlling said processing means by an external operation, wherein said external operation selectively turns said processing of said data signals ON and OFF when said picture signals on a same track of said recording medium are repeatedly reproduced, thereby preventing video noise due to processing of said data signals, and wherein said data signals consist of signals other than video signals.

2. A still video apparatus according to claim 1, wherein said data signals recorded on the magnetic disk are modulated by a DPSK modulation signal.

3. The still video apparatus of claim 1, wherein said data signals comprise format signals.

4. The still video apparatus of claim 3, wherein said format signals comprise frame and field information.

5. The still video apparatus of claim 1, further comprising:
   memory means for storing said data signals which have been extracted and processed;
   wherein said means for reproducing said data signals which have been extracted and processed reproduce said data signals which have been extracted and processed, as well as stored in said memory means for storing, when said external operation stops said processing of data signals while reproduction of picture signals continues, thereby preventing video noise due to processing of said data signals.

6. The still video apparatus of claim 1, wherein operations encoded by said data signals continue to be carried out when said external operation stops said processing of data signals while reproduction of picture signals continues.

7. The still video apparatus of claim 1, wherein said picture signals and said data signals are recorded upon multiple recording tracks of said magnetic disk.

8. A still video apparatus comprising:
   means for reading multiple recorded signals from a magnetic disk on which picture signals and data signals are recorded together to form said multiple recorded signals, wherein said data signals recorded on the magnetic disk are modulated by a DPSK modulation;
   means for extracting and reproducing said picture signals from the multiple recorded signals read by said reading means; and
   means for extracting said data signals from said multiple recorded signals read by said reading means;
   means for processing said data signals which have been extracted by said extracting means, wherein said data signal processing means comprise means for rectifying the waves of said extracted DPSK modulated signals, and a DPSK demodulation circuit for DPSK-demodulating said rectified modulated data signals; and
   means for controlling said data signal processing means by an external operation, wherein said external operation can stop said rectifying of waves of said extracted DPSK modulated signals while reproduction of picture signals continues, thereby preventing video noise due to processing of said data signals.

9. A still video apparatus according to claim 8, wherein said data signal processing means stops said rectifying operation of said rectifying means when said data signal processing means is turned OFF by said control means.

10. The still video apparatus of claim 8, wherein said data signals comprise format signals.

11. The still video apparatus of claim 10, wherein said format signals comprise frame and field information.

12. The still video apparatus of claim 8, wherein operations encoded by said data signals continue to be carried out when said external operation stops said processing of data signals while reproduction of picture signals continues.

13. The still video apparatus of claim 8, wherein said data signals consist of signals other than video signals.

14. The still video apparatus of claim 8, wherein said picture signals and said data signals are recorded upon multiple recording tracks of said magnetic disk.

15. A still video apparatus comprising:
   a magnetic head which reads multiple recorded signals consisting of picture signals and data signals from a same track of a magnetic disk on which said multiple recorded signals are recorded, said data signals being superimposed on said picture signals;
   means for tracking the magnetic head to a desired track of the magnetic disk on which said multiple recorded signals are recorded;
   picture signal reproducing means and data signal processing means for separating said multiple recorded signals read by said magnetic head into said picture signals and said data signals to reproduce the same;
   means for controlling the reproduction operation of said picture signal reproducing means and means for controlling said data signal processing means, wherein said control means is operative to stop reproduction of picture signals while processing of data signals is being performed; and
   means for optionally controlling said data signal processing means by an external operation, wherein said external operation selectively turns said processing of said data signals ON and OFF when said picture signals on a same track of said recording medium are repeatedly reproduced, thereby preventing video noise due to processing of said data signals, wherein operations encoded by said data signals continue to be carried out when said external operation stops said processing of data signals while reproduction of picture signals continues.

16. A still video apparatus according to claim 15, wherein said control means causes said data signal processing means to process at least one of a first or predetermined number of data signals which are read by the magnetic head, so that no processing of said data signals which are read by subsequent reading operations can be performed.

17. A still video apparatus according to claim 16, wherein said control means causes said picture signal reproducing means to commence the reproduction of said picture signals after said processing of said data signals by said data signal processing means is stopped.

18. A still video apparatus according to claim 15, wherein said data signals are modulated using DPSK modulation to be multi-recorded on the magnetic disk.

19. A still video apparatus according to claim 15, wherein said picture signal reproducing means outputs mute signals until the the reproduction of said picture signals is commenced.

20. The still video apparatus of claim 15, wherein said data signals comprise format signals.

21. The still video apparatus of claim 20, wherein said format signals comprise frame and field information.

22. The still video apparatus of claim 15, wherein said data signals consist of signals other than video signals.

23. The still video apparatus of claim 15, wherein said picture signals and said data signals are recorded upon multiple recording tracks of said magnetic disk.

24. A still video apparatus comprising:

a magnetic head which reads multiple recorded signals consisting of picture signals and data signals from a magnetic disk on which said multiple recorded signals are recorded, said data signals being superimposed on said picture signals;

means for tracking the magnetic head to a desired track of the magnetic disk;

picture signal reproducing means and data signal extracting means for separating said multiple recorded signals read by said magnetic head into said picture signals and said data signals to reproduce the same;

data signal processing means comprising a wave-shaping circuit which shapes the waves of said data signals, wherein said data signals comprise DPSK modulated signals, and a DPSK demodulation circuit for DPSK-demodulating said shaped DPSK modulated signals; and means for controlling the reproduction operation of said picture signal reproducing means and the processing operation of said data signal processing means, wherein said control means is operative to stop reproduction of picture signals while processing of data signals is performed, thereby preventing video noise due to processing of said data signals, and wherein said control means is operative to selectively turn said DPSK modulated signals ON and OFF when said picture signals on said desired track are repeatedly reproduced.

25. A still video apparatus according to claim 24, wherein if more than one of said multiple recorded signals are read, said control means causes the wave-shaping circuit to shape the waves of said at least one of a first or predetermined number of DPSK modulated signals which are read by said data signal reading means, so that wave-shaping of subsequent DPSK modulated signals can be prevented.

26. The still video apparatus of claim 24, wherein said data signals comprise format signals.

27. The still video apparatus of claim 26, wherein said format signals comprise frame and field information.

28. The still video apparatus of claim 24, wherein operations encoded by said data signals continue to be carried out when said control means stops said processing of data signals while reproduction of picture signals continues.

29. The still video apparatus of claim 24, wherein said data signals consist of signals other than video signals.

30. The still video apparatus of claim 24, wherein said picture signals and said data signals are recorded upon multiple recording tracks of said magnetic disk.

31. The still video apparatus of claim 24, wherein said wave-shaping circuit rectifies the waves of said data signals.

32. A still video apparatus comprising:

a magnetic head which reads multiple recorded signals consisting of picture signals and control data signals from a magnetic disk on which said multiple recorded signals are recorded;

means for tracking the magnetic head to a desired track of the magnetic disk;

picture signal reproducing means and control data signal extracting means for separating said multiple recorded signals read by said magnetic head into said picture signals and said control data signals to reproduce the same;

means for processing said control data signals which have been extracted by said extracting means;

first means for automatically controlling the reproduction operation of said picture signal reproducing means and for controlling said processing means;

second means for optionally controlling said processing means by an external operation, wherein said second means is operative to stop processing of control data signals, after a control operation has been initiated according to said control data signals, while reproduction of picture signals continues unchanged by said stopping of processing of said control data signals, thereby preventing video noise due to processing of said control data signals.

33. A still video apparatus according to claim 32, wherein said first control means causes said control data processing means to reproduce at least one of a first or predetermined number of said control data signals which are read by the magnetic head, so that no reproduction of said control data signals which are read by subsequent reading operations can be performed.

34. A still video apparatus according to claim 33, wherein said first control means causes said picture signal reproducing means to commence the reproduction of said picture signals after the processing of said control data signals by said control data signal processing means is stopped.

35. A still video apparatus according to claim 32, wherein said control data signals are modulated using DPSK modulation to be multi-recorded on the magnetic disk.

36. A still video apparatus according to claim 32, wherein said picture signal reproducing means outputs mute signals until the the reproduction of said picture signals has commenced.

37. The still video apparatus of claim 32, wherein said data signals comprise format signals.

38. The still video apparatus of claim 37, wherein said format signals comprise frame and field information.

39. The still video apparatus of claim 32, wherein said first means for controlling said processing means is operative to stop processing of said control data signals while reproduction of picture signals continues, thereby preventing video noise due to processing of said control data signals, wherein operations encoded by said control data signals continue to be carried out when said first means for controlling stops said processing of control data signals while reproduction of picture signals continues.

40. The still video apparatus of claim 32, wherein operations encoded by said control data signals continue to be carried out when said second means for optionally controlling said processing means stops said processing of data signals while reproduction of picture signals continues.

41. The still video apparatus of claim 32, wherein said control data signals consist of signals other than video signals.

42. The still video apparatus of claim 32, wherein said picture signals and said control data signals are recorded upon multiple recording tracks of said magnetic disk.

43. A still video apparatus comprising:
- a magnetic head which reads multiple recorded signals consisting of picture signals and data signals from a magnetic disk on which said multiple recorded signals are recorded;
- means for tracking the magnetic head to a desired track of the magnetic disk;
- picture signal reproducing means and data signal extracting means for separating said multiple recorded signals read by the magnetic head into said picture signals and said data signals to reproduce the same, wherein said data signals comprise DPSK modulated signals, and said data signal extracting means comprises a band pass filter which extracts said DPSK modulated signals from said multiple recorded signals;
- a wave-shaping circuit which shapes the waves of said DPSK modulated signals, and a DPSK demodulation circuit for DPSK-demodulating said shaped DPSK modulated signals;
- first means for automatically controlling the reproduction operation of said picture signal reproducing means and the wave-shaping operation of said wave-shaping circuit; and
- second means for controlling wave-shaping of said wave-shaping circuit by an external operation, thereby preventing video noise due to wave-shaping of said data signals.

44. A still video apparatus according to claim 43, wherein if said multiple recorded signals are read more than once, said control means causes said wave-shaping circuit to shape the waves of said at least one of a first or predetermined number of DPSK modulated signals which are read by said data signal reading means, so that wave-shaping of the subsequent DPSK modulated signals can be prevented.

45. The still video apparatus of claim 43, wherein said data signals comprise format signals.

46. The still video apparatus of claim 45, wherein said format signals comprise frame and field information.

47. The still video apparatus of claim 45, further comprising:
- memory means for storing said demodulated, shaped DPSK signals; wherein operations encoded by said data signals continue to be carried out even when said wave shaping operation is stopped, said demodulated, shaped DPSK signals being reproduced from said memory means for storing while reproduction of picture signals continues, thereby preventing video noise due to wave-shaping of said data signals.

48. The still video apparatus of claim 43, wherein said data signals consist of signals other than video signals.

49. The still video apparatus of claim 43, wherein said picture signals and said data signals are recorded upon multiple recording tracks of said magnetic disk.

50. The still video apparatus of claim 43, wherein said wave-shaping circuit rectifies the waves of said DPSK modulated signals.

* * * * *

UNITED STATES PATENT AND TRADEMARK OFFICE
CERTIFICATE OF CORRECTION

PATENT NO. : 5,748,833
DATED : May 5, 1998
INVENTOR(S) : K. Sato

It is certified that error appears in the above-identified patent and that said Letters Patent is hereby corrected as shown below:

On the cover page of the printed patent, paragraph [63] U.S. Application Data, line 3, change "continuation-in-part" to ---continuation---.

Signed and Sealed this

First Day of September, 1998

BRUCE LEHMAN

*Attest:*

*Attesting Officer*        Commissioner of Patents and Trademarks